(12) United States Patent
Palanchon

(10) Patent No.: US 10,811,737 B2
(45) Date of Patent: *Oct. 20, 2020

(54) CONFORMAL FLUID-COOLED HEAT EXCHANGER FOR BATTERY

(71) Applicant: Dana Canada Corporation, Oakville (CA)

(72) Inventor: Hervé Palanchon, Ulm (DE)

(73) Assignee: DANA CANADA CORPORATION, Oakville (CA)

(*) Notice: Subject to any disclaimer, the term of this patent is extended or adjusted under 35 U.S.C. 154(b) by 268 days.

This patent is subject to a terminal disclaimer.

(21) Appl. No.: 15/851,972

(22) Filed: Dec. 22, 2017

(65) Prior Publication Data

US 2018/0123193 A1 May 3, 2018

Related U.S. Application Data

(63) Continuation of application No. 13/261,623, filed as application No. PCT/CA2011/050620 on Oct. 3, 2011, now Pat. No. 9,887,437.

(Continued)

(51) Int. Cl.
*H01M 10/61* (2014.01)
*H01M 10/6567* (2014.01)
(Continued)

(52) U.S. Cl.
CPC ............... *H01M 10/61* (2015.04); *F28F 3/12* (2013.01); *H01M 2/00* (2013.01); *H01M 10/613* (2015.04);
(Continued)

(58) Field of Classification Search
CPC ............... H01M 10/61; H01M 10/613; H01M 10/6555; H01M 10/6567; H01M 2/00;
(Continued)

(56) References Cited

U.S. PATENT DOCUMENTS 3,229,763 A 1/1966 Rosenbald
6,709,783 B2 3/2004 Ogata et al.
(Continued)

FOREIGN PATENT DOCUMENTS

CA 1229377 A1 11/1987
JP 2000048867 A 2/2000
(Continued)

OTHER PUBLICATIONS

Machine-generated English Translation of JP 2000048867, obtained via Espacenet Patent Search.
(Continued)

*Primary Examiner* — Milton I Cano
*Assistant Examiner* — Philip A. Stuckey
(74) *Attorney, Agent, or Firm* — McCoy Russell LLP

(57) ABSTRACT

A heat exchanger for a battery unit having at least a first battery module and a second battery module is disclosed wherein the first and second battery modules each include a plurality of battery cell containers each housing at least one battery cell. The first and second battery modules are spaced apart from each other with the heat exchanger being arranged between the spaced apart first and second battery modules. The heat exchanger is a laminated plate structure defining a plurality of fluid flow chambers each located within a respective fluid flow region for transmitting a heat exchanger fluid. Each of the fluid flow regions is dimensionally compliant independent of the other fluid flow regions to conform to the spacing of the respective battery cell containers in the first and second modules between which the specific fluid flow region is positioned when arranged between the first and second battery modules.

19 Claims, 13 Drawing Sheets

Related U.S. Application Data

(60) Provisional application No. 61/389,301, filed on Oct. 4, 2010.

(51) Int. Cl.
*H01M 10/6555* (2014.01)
*F28F 3/12* (2006.01)
*H01M 2/00* (2006.01)
*H01M 10/613* (2014.01)
*F28D 1/03* (2006.01)
*F28D 21/00* (2006.01)
*H01M 10/0525* (2010.01)

(52) U.S. Cl.
CPC ... *H01M 10/6555* (2015.04); *H01M 10/6567* (2015.04); *F28D 1/0341* (2013.01); *F28D 2021/0043* (2013.01); *H01M 10/0525* (2013.01); *Y10T 29/49108* (2015.01)

(58) Field of Classification Search
CPC . H01M 10/0525; F28F 3/12; Y10T 29/49108; F28D 2021/0043; F28D 1/0341
See application file for complete search history.

(56) References Cited

U.S. PATENT DOCUMENTS

| | | | |
|---|---|---|---|
| 2001/0007728 A1* | 7/2001 | Ogata | H01M 2/0245 429/120 |
| 2002/0102454 A1 | 8/2002 | Zhou et al. | |
| 2002/0195237 A1 | 12/2002 | Luz et al. | |
| 2004/0142238 A1 | 7/2004 | Asahina et al. | |
| 2005/0089750 A1 | 4/2005 | Ng et al. | |
| 2006/0115720 A1 | 6/2006 | Kim | |
| 2007/0285051 A1 | 12/2007 | Jeon et al. | |
| 2008/0110595 A1* | 5/2008 | Palanchon | F28D 9/0043 165/103 |
| 2008/0311468 A1 | 12/2008 | Hermann et al. | |
| 2011/0189525 A1 | 8/2011 | Palanchon et al. | |

FOREIGN PATENT DOCUMENTS

| | | |
|---|---|---|
| JP | 2005518642 A | 6/2005 |
| WO | 2011094863 A1 | 8/2001 |
| WO | 2003071616 A1 | 8/2003 |

OTHER PUBLICATIONS

Machine-generated English Translation of JP 2005518642, obtained via J-PlatPat.
International Search Report and Written Opinion of PCT/CA2011/050620, dated Dec. 14, 2011.

\* cited by examiner

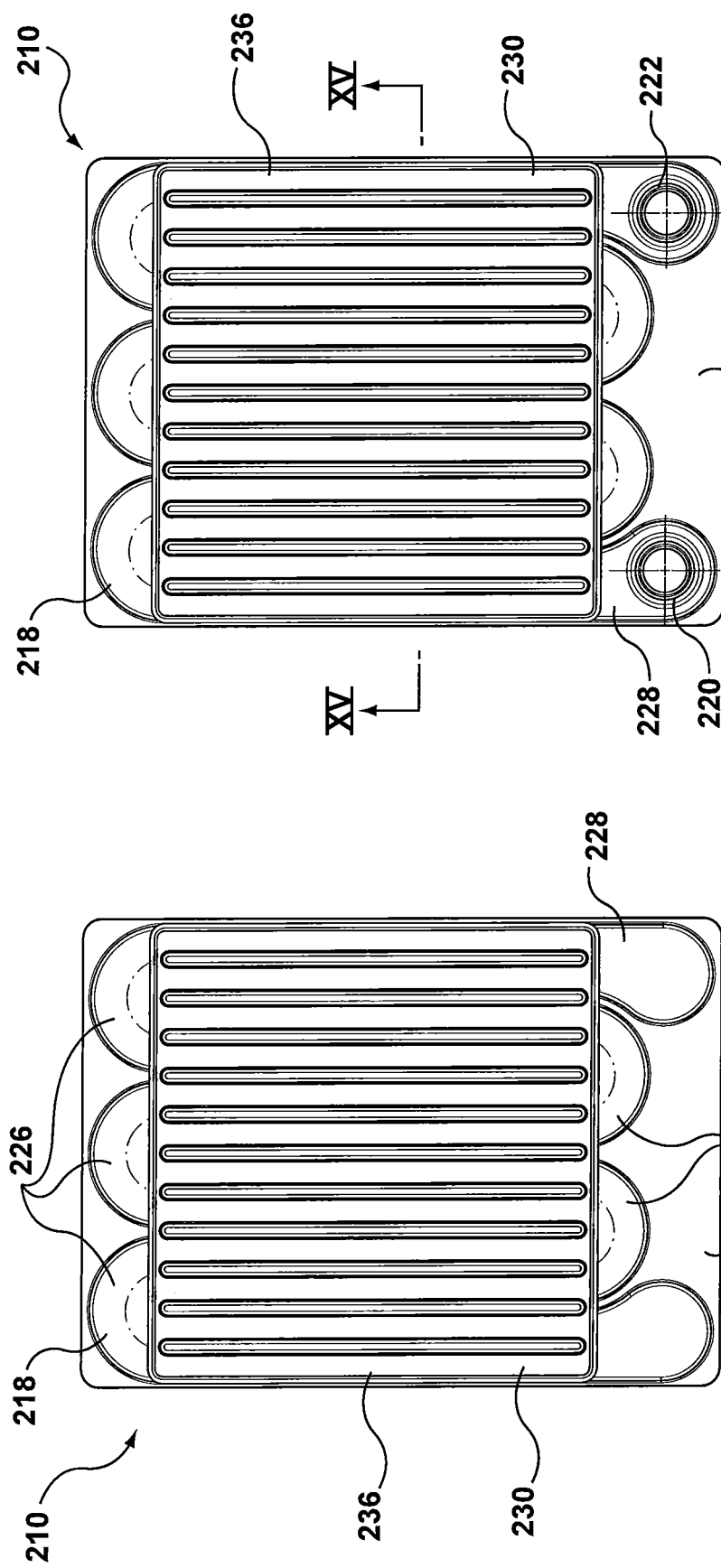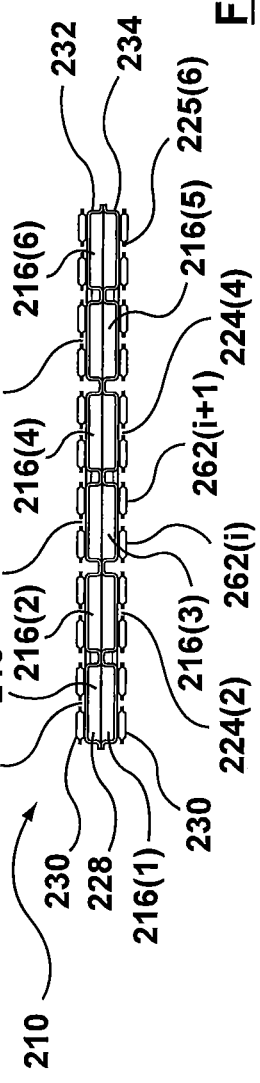
FIG. 13
FIG. 14
FIG. 15

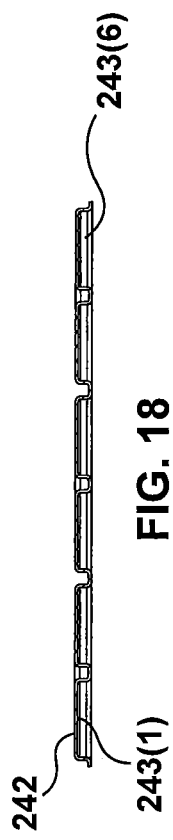
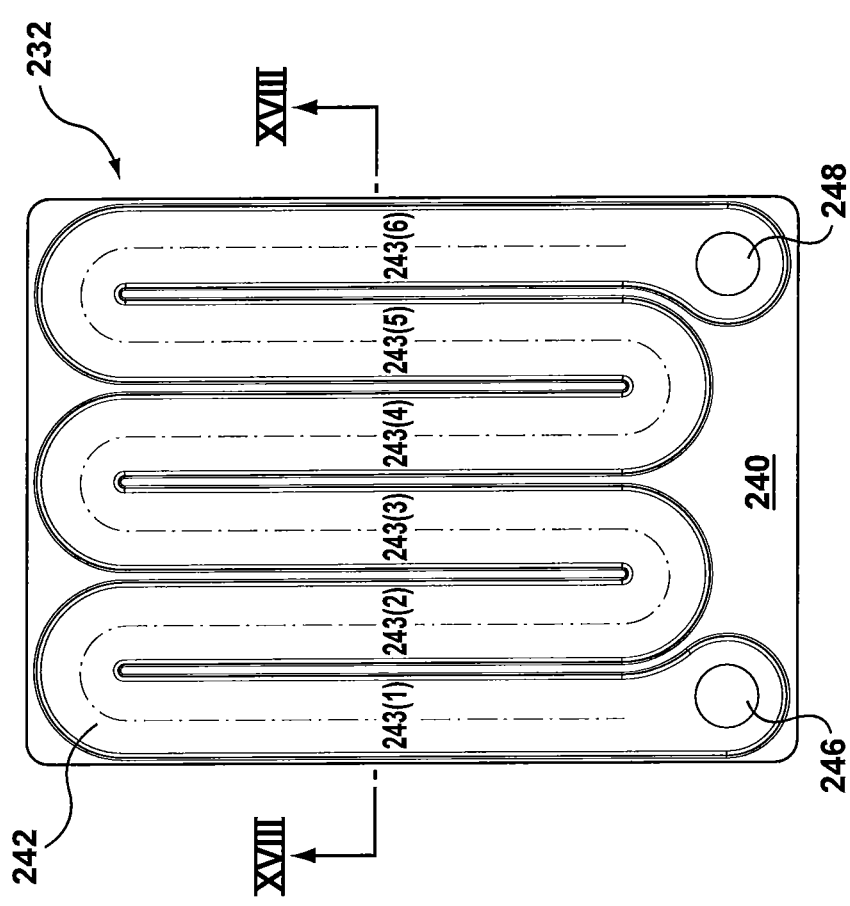
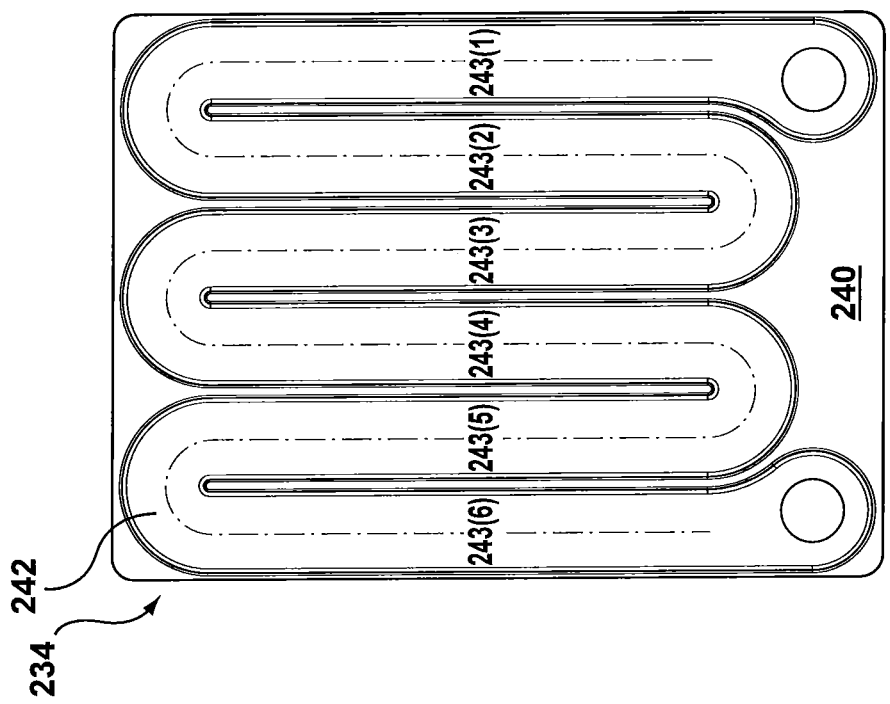
FIG. 16
FIG. 17
FIG. 18

CONFORMAL FLUID-COOLED HEAT EXCHANGER FOR BATTERY

CROSS-REFERENCE TO RELATED APPLICATION

This application is a continuation application based on U.S. patent application Ser. No. 13/261,623 filed Jun. 10, 2013, now U.S. Pat. No. 9,887,437, which claims priority to U.S. Provisional Patent Application No. 61/389,301 filed Oct. 4, 2010. The content of the above patent applications are hereby expressly incorporated by reference into the detailed description hereof.

BACKGROUND

This disclosure relates to heat exchangers used to dissipate heat in rechargeable batteries and other electricity producing cells.

Rechargeable batteries such as batteries made up of many lithium-ion cells can be used in many applications, including for example in electric vehicle ("EV") and hybrid electric vehicle ("HEV") applications among other things. Such batteries can generate large amounts of heat that needs to be dissipated.

SUMMARY

According to an example embodiment of the present disclosure there is provided a heat exchanger for a battery unit, the heat exchanger comprising:
first and second inner core plates, each inner core plate comprising:
  a generally planar plate portion; and
  a serpentine boss formed in and extending out of the generally planar plate portion, the serpentine boss being made up of a plurality of generally parallel inner core plate regions interconnected by U-shaped regions and extending between an inlet end and an outlet end;
  wherein said first and second inner core plates are arranged in mating relationship, with one plate being inverted with respect to the other such that the serpentine boss of one plate is spaced apart from the serpentine boss of the other plate so as to form an internal fluid flow passage therebetween that extends from said inlet end to said outlet out;
a fluid inlet in fluid communication with said inlet end of said internal fluid flow passage for inletting a heat exchange fluid into said heat exchanger;
a fluid outlet in fluid communication with said outlet end of said internal fluid flow passage for discharging said heat exchange fluid from said heat exchanger; and
first and second compliant plate structures, wherein said first compliant plate structure is arranged on and secured to the first inner core plate and said second compliant plate structure is arranged on and secured to the second inner core plate;
  wherein said first and second compliant plate structures are resiliently deformable so as to compress under pressure and to return to normal shape upon removal of said pressure.

According to another example embodiment of the present disclosure there is provided a battery unit, comprising:
a first battery module comprising a plurality of battery cell containers each housing at least one battery cell;
a second battery module comprising a plurality of battery cell containers each housing at least one battery cell; wherein the first battery module and second battery module are disposed in spaced apart relationship to one another;
a heat exchanger disposed between the first battery module and the second battery module such that a first side of the heat exchanger is in contact with, or substantially in contact with, the plurality of battery cell containers of the first battery module and a second side of the heat exchanger is in contact with, or substantially in contact with, the plurality of battery cell containers of the second battery module, wherein the heat exchanger includes:
first and second inner core plates, each inner core plate comprising:
  a generally planar plate portion; and
  a serpentine boss formed in and extending out of the generally planar plate portion, the serpentine boss being made up of a plurality of generally parallel inner core plate regions interconnected by U-shaped regions and extending between an inlet end and an outlet end;
  wherein said first and second inner core plates are arranged in mating relationship, with one plate being inverted with respect to the other such that the serpentine boss of one plate extends out of the generally planar portion in a first direction while the serpentine boss of the other one of the first and second plates extends out of the generally planar portion in a second direction opposite to the first direction such that while the first and second inner core plates are disposed in their mating relationship the oppositely disposed serpentine bosses define an internal fluid flow passage therebetween that extends from said inlet end to said outlet out;
a fluid inlet in fluid communication with said inlet end of said internal fluid flow passage for inletting a heat exchange fluid into said heat exchanger;
a fluid outlet in fluid communication with said outlet end of said internal fluid flow passage for discharging said heat exchange fluid from said heat exchanger; and
a first compliant plate structure disposed on and secured to the first inner core plate and defining the first side of the heat exchanger;
a second compliant plate structure disposed on and secured to the second inner core plate and defining the second side of the heat exchanger;
wherein said first and second compliant plate structures are resiliently deformable so as to compress under pressure and to return to normal shape upon removal of said pressure to conform to variations in spacing between the first and second battery modules across the plurality of the battery cell containers in the first and second battery modules.

BRIEF DESCRIPTION OF DRAWINGS

FIG. 13 is a plan view of one side of the heat exchanger of FIG. 12.

FIG. 14 is a plan view of the opposite heat exchanger of FIG. 12.

FIG. 15 is a sectional view of the heat exchanger taken across the lines XV-XV of FIG. 14.

FIG. 16 is plan view of a first core plate of the heat exchanger of FIG. 12.

FIG. 17 is a plan view of a second core plate of the heat exchanger of FIG. 12.

FIG. 18 is a sectional view of the second core plate taken across the lines XVIII-XVIII of FIG. 17.

DESCRIPTION OF EXAMPLE EMBODIMENTS

Reference will now be made in detail to implementations of the technology. Each example is provided by way of explanation of the technology only, not as a limitation of the technology. It will be apparent to those skilled in the art that various modifications and variations can be made in the present technology. For instance, features described as part of one implementation of the technology can be used on another implementation to yield a still further implementation. Thus, it is intended that the present technology cover such modifications and variations that come within the scope of the technology.

Figure 1:
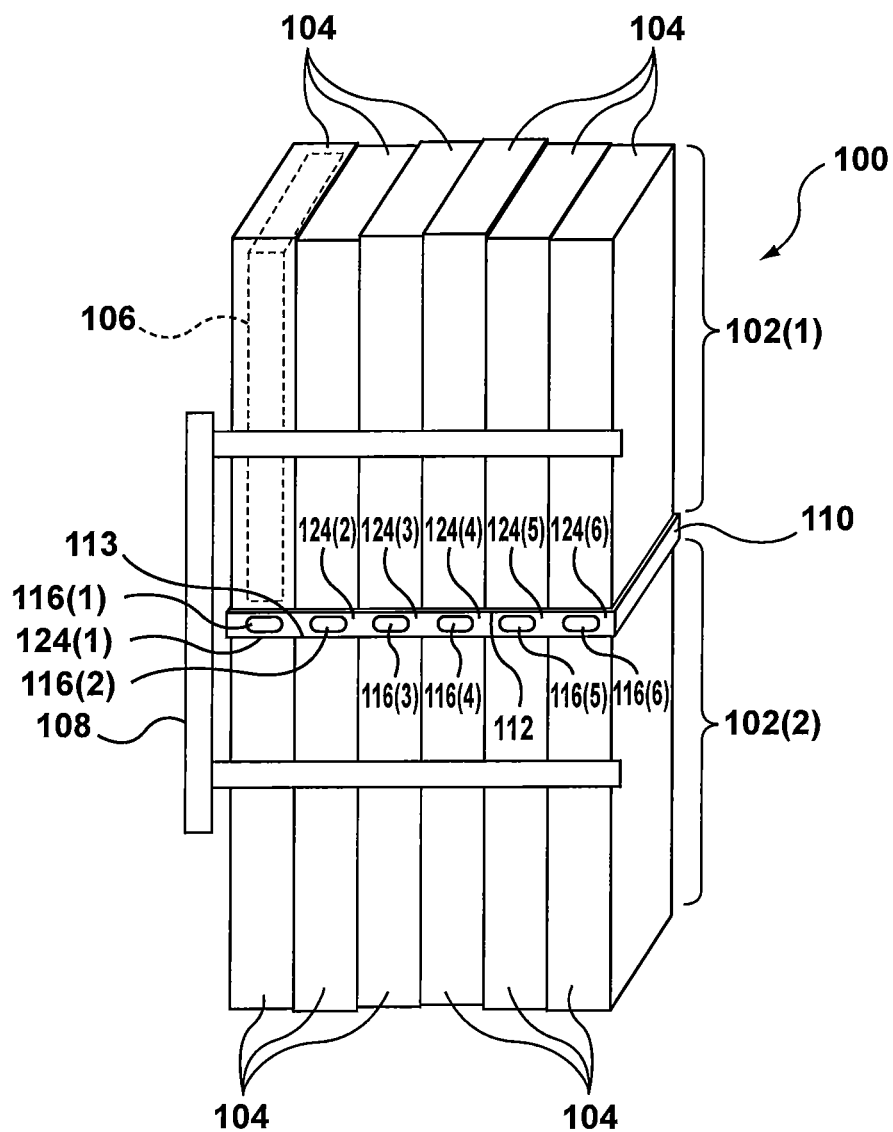
FIG. 1 is a schematic perspective view of a battery unit according to an example embodiment.

FIG. 1 shows an illustrative example of a rechargeable battery unit 100 according to example embodiments of the invention. The battery unit 100 is made up of battery stacks or modules 102(1) and 102(2) (generically referred to as 102(i) herein) which in turn are made of battery cell containers 104 that each house one or more battery cells 106. The illustrated embodiment includes two rectangular box-like modules 102(i), each of which is made up of six horizontally arranged cell containers 104, with each cell container 104 housing one or more battery cells 106. The number of modules 102(i) in the battery unit 100, the number of cell containers 104 in each module 102(i), and the number of battery cells 106 in each battery cell container 104 can vary and the orientation and shape of these components can vary as well from application to application and accordingly the quantities and orientation in this description are provided as an example of an illustrative embodiment only.

In at least some example embodiments, battery cells 106 are lithium-ion battery cells, however other rechargeable battery cells could be used. In some embodiments, battery cells 106 are prismatic lithium-ion battery cells. In other example embodiments, battery cells 106 have cylindrical or other shapes. In the illustrated embodiment, each battery cell container 104 includes a rectangular substantially rigid box-like case housing one or more battery cells 106. In some embodiments, all of the cell containers 104 within a module 102(i) are substantially identical and the modules 102(i) that make up a battery unit 100 are substantially identical. In example embodiments, the battery modules 102(i) may be mounted side by side or one above the other in a support frame or rack 108. In some embodiments battery cell container 104 may be non-rigid.

Figure 2:
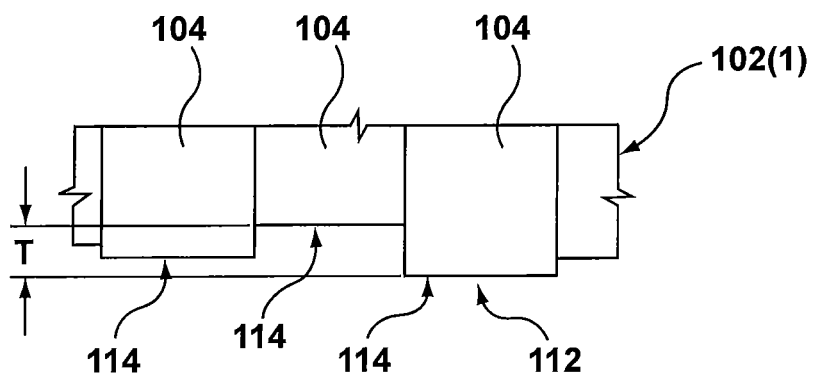
FIG. 2 is an enlarged front view illustrating part of three adjacent battery cell containers of one of the battery modules of the battery unit of FIG. 1.

According to example embodiments, a heat exchanger 110 is located between opposing surfaces 112 and 113 of adjacent battery modules 102(1) and 102(2). The contact surfaces 112 and 113 between the respective modules 102(1) and 102(2) and the intermediate heat exchanger 110 may not be perfectly flat surfaces, and furthermore may be subject to distortion due to expansion and contraction during heating and cooling. By way of example, FIG. 2 illustrates a contact surface 112 defined by the heat exchanger contacting sides 114 of three adjacent battery cell containers 104 in the upper module 102(1). As a result of manufacturing tolerances of the cell containers 104, as well as module assembly tolerances, the cell containers 104 may not be perfectly identical or perfectly aligned. As a result, the heat exchanger contacting sides 114 are not aligned, resulting in a heat exchanger contact surface 112 that is not planer, but rather includes small height transitions at the boundaries between adjacent cell containers 104. As shown in FIG. 2, "T" represents a maximum displacement tolerance between the heat exchanger contacting sides 114 of the cell containers 104 in a module 102. By way of non-limiting example, tolerance T could for example be in the range of 0.5 mm to 1 mm in some applications, however tolerance outside this range may also exist in some applications.

Accordingly, a heat exchanger 110 that can maintain consistent contact with the geometry of the cell containers 104 between adjacent modules 102(i) over a range of temperatures and contact surface tolerances and provide good heat conductivity is desirable in some applications. In this regard, example embodiments relate to a heat exchanger structure that is dimensionally compliant to maintain contact with battery cells containers 104 across the battery unit 100 even if the battery cell containers do not define a planar heat exchanger contact surface. In some examples, the dimensionally compliant heat exchanger 110 compresses under expansion of the first and second battery modules and expand under subsequent contraction of the first and second battery modules such that the heat exchanger structure remains in thermal contact with the battery cell containers 104 throughout a range of normal battery operating temperatures.

Figure 3:
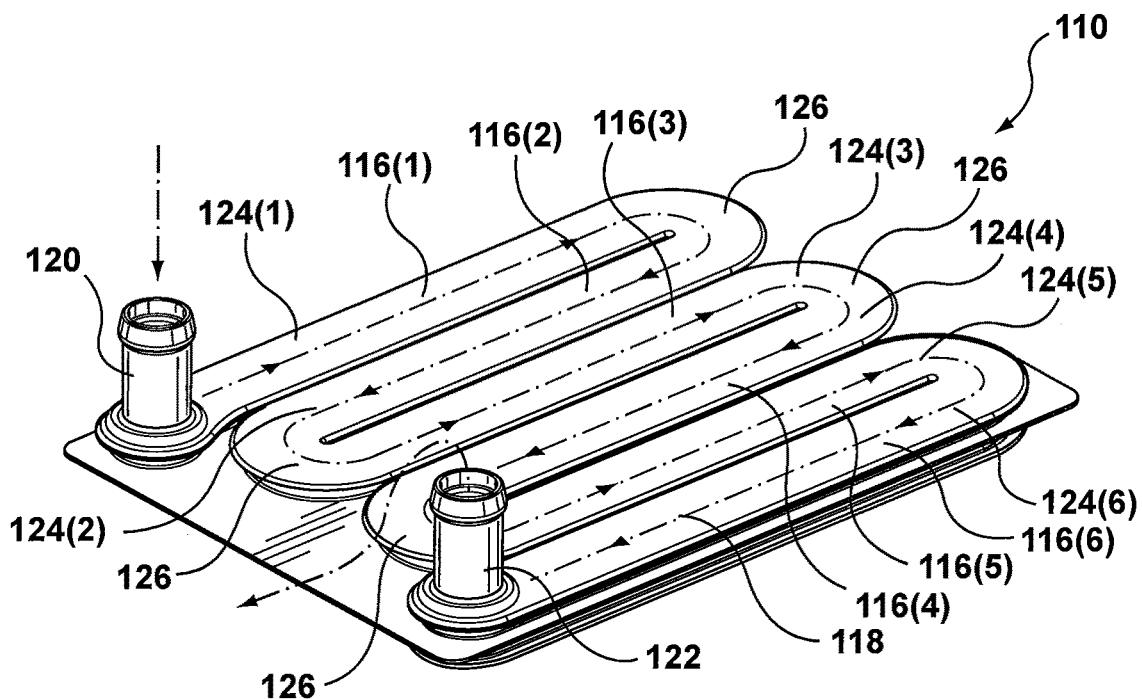
FIG. 3 is a perspective view of a fluid-cooled heat exchanger according to an example embodiment.
Figure 4:
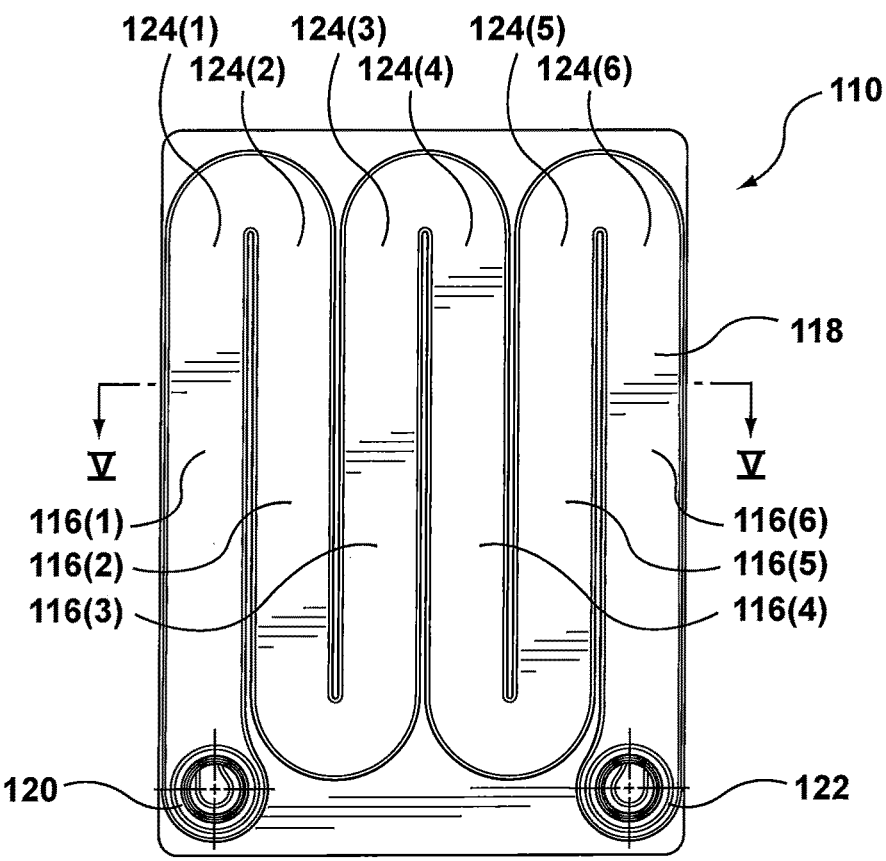
FIG. 4 is a plan view of the heat exchanger of FIG. 3.

Referring to FIGS. 3 and 4, in one example embodiment, the heat exchanger 110 is a multi-pass plate-type heat exchanger that defines an internal serpentine heat exchanger fluid flow passage 118 having a first end in fluid communication with an inlet fixture 120 and a second end in fluid communication with an outlet fixture 122. In the illustrated example, the serpentine fluid flow passage 118 includes multiple serially connected parallel fluid chambers 116(1)-116(6) (generically referred to using reference number 116(i) herein and represented by dashed lines in FIG. 3), with each fluid chamber being joined to a successive fluid chamber by a respective substantially U-shaped flow passage 126. In operation, a heat exchange fluid such as a cooling fluid enters fluid inlet fixture 120, flows through fluid chamber 116(1), through a first U-turn passage 126 into fluid chamber 116(2) and then through a second U-turn passage 126 into fluid chamber 116(3) and so on until the fluid flows through the final fluid chamber 116(6) and exits from outlet fixture 122. The heat exchanger fluid travelling through internal flow passage 118 could for example be a cooling liquid such as water or other liquid or gaseous fluid refrigerant for drawing heat away from battery cell containers 104. In some example embodiments, the heat exchanger fluid travelling through internal flow passage 118 could for example be a heating liquid for heating battery cell containers 104.

As schematically represented in FIG. 1, in one example embodiment each fluid chamber 116(i) is positioned between a cell container 104 located in one module 102(1) and an opposing cell container 104 located in the adjacent module 102(2). In the illustrated example, the heat exchanger includes six parallel fluid chambers 116(1)-116 (6), with each fluid chamber 116(i) being located between a respective opposing pair of battery cell containers 104 in the battery unit 100, however the number of fluid chambers may be less than or more than six depending on the specific application. In some example embodiments, the U-shaped regions that define U-turn passages 126 are exposed and extend outward beyond the sides of battery modules 102(1), 102(2) such that the U-turn passages 126 are not positioned between the battery cell containers 104. In some example embodiments, the U-shaped regions are not exposed and are positioned between the battery modules 102(1), 102(2). The fluid chambers 116(1)-116(6) are each formed within a respective fluid chamber region 124(1)-124(6) (generically referred to using reference number 124(i) herein) of the heat exchanger 110. As will be explained in greater detail below, in example embodiments, each of the fluid chamber regions 124(i) is individually conformable independently of the other fluid chamber regions 124(i) of the heat exchanger 110 such that inter-cell container variances in opposing surfaces 112, 113 between the adjacent modules 102(1) and 102(2) can be accommodated by the heat exchanger 110.

Figure 5:
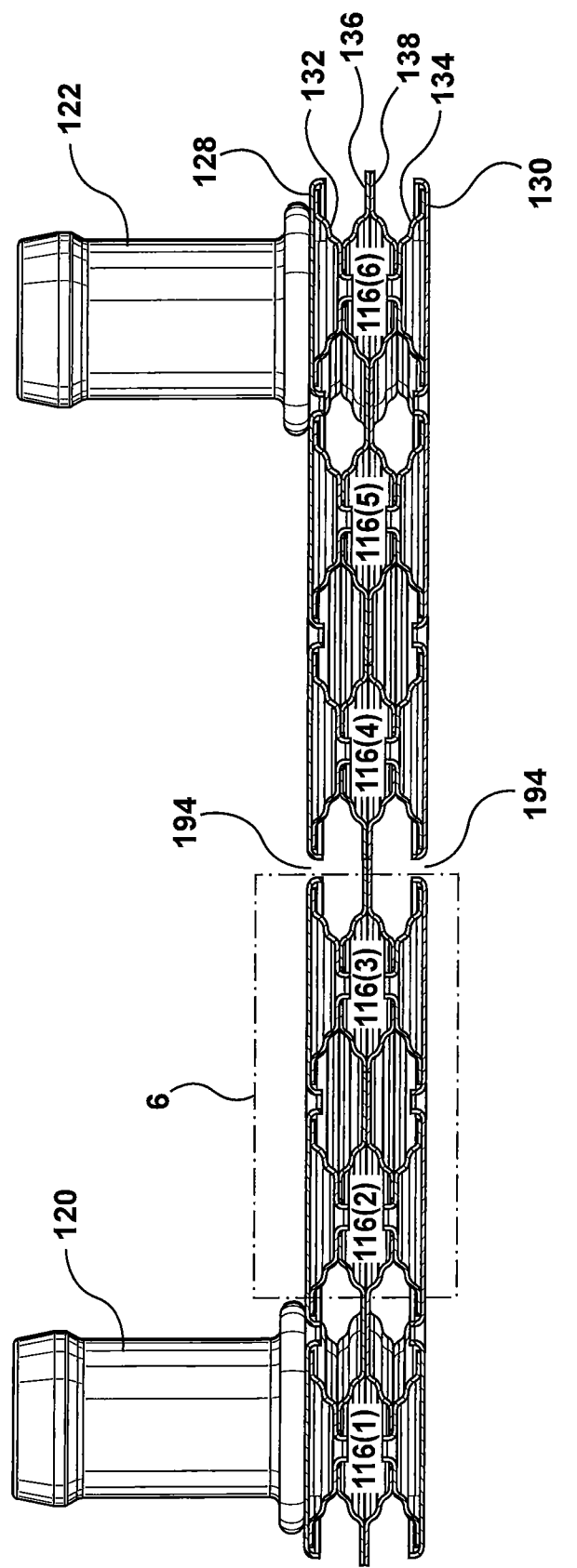
FIG. 5 is a sectional view of the heat exchanger taken across the lines V-V of FIG. 4.
Figure 6:
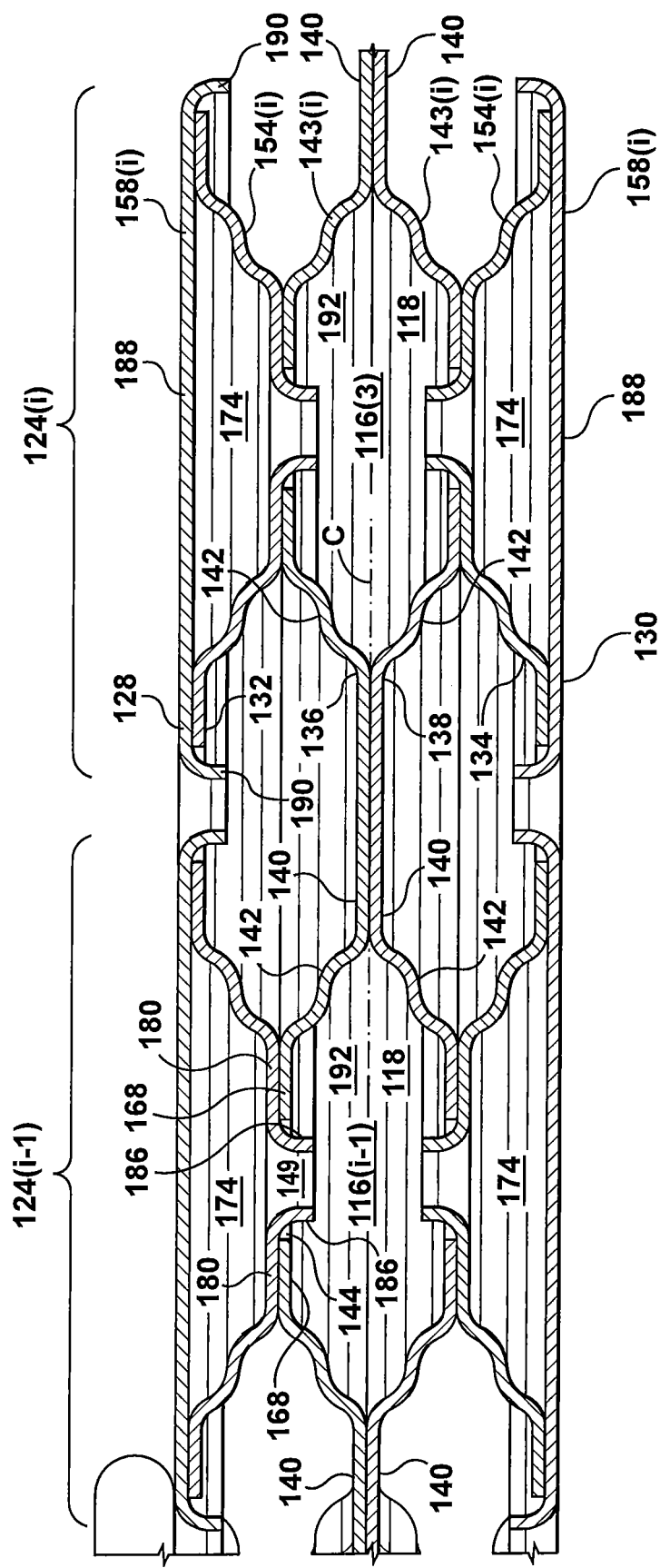
FIG. 6 is an enlarged view of portion 6 of FIG. 5.
Figure 7:
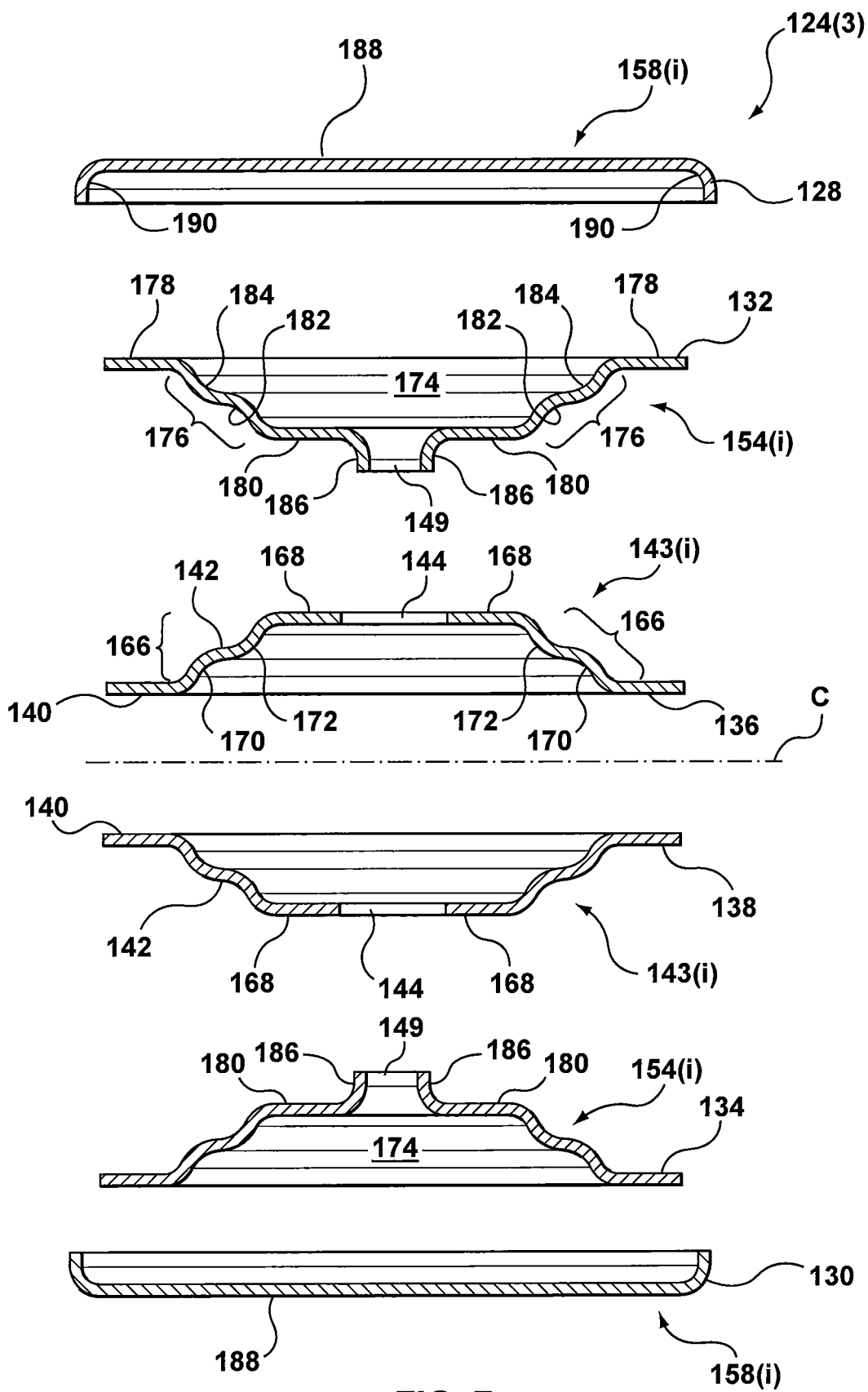
FIG. 7 is an exploded view of a flow chamber region of FIG. 6.

Referring to the sectional views of the heat exchanger 110 shown in FIGS. 5-7, in one example embodiment the body of heat exchanger 110 is formed from six plates that are laminated together, namely first and second outer cover plates 128, 130; first and second outer core plates 132, 134; and first and second inner core plates 136, 138. In an example embodiment, the plates are each formed from roll formed or stamped aluminum or aluminum alloy and are brazed together to form the body of the heat exchanger 110. However, the heat exchanger could alternatively be formed from other resilient metals or materials, including plastics, and other processes.

Figure 8:
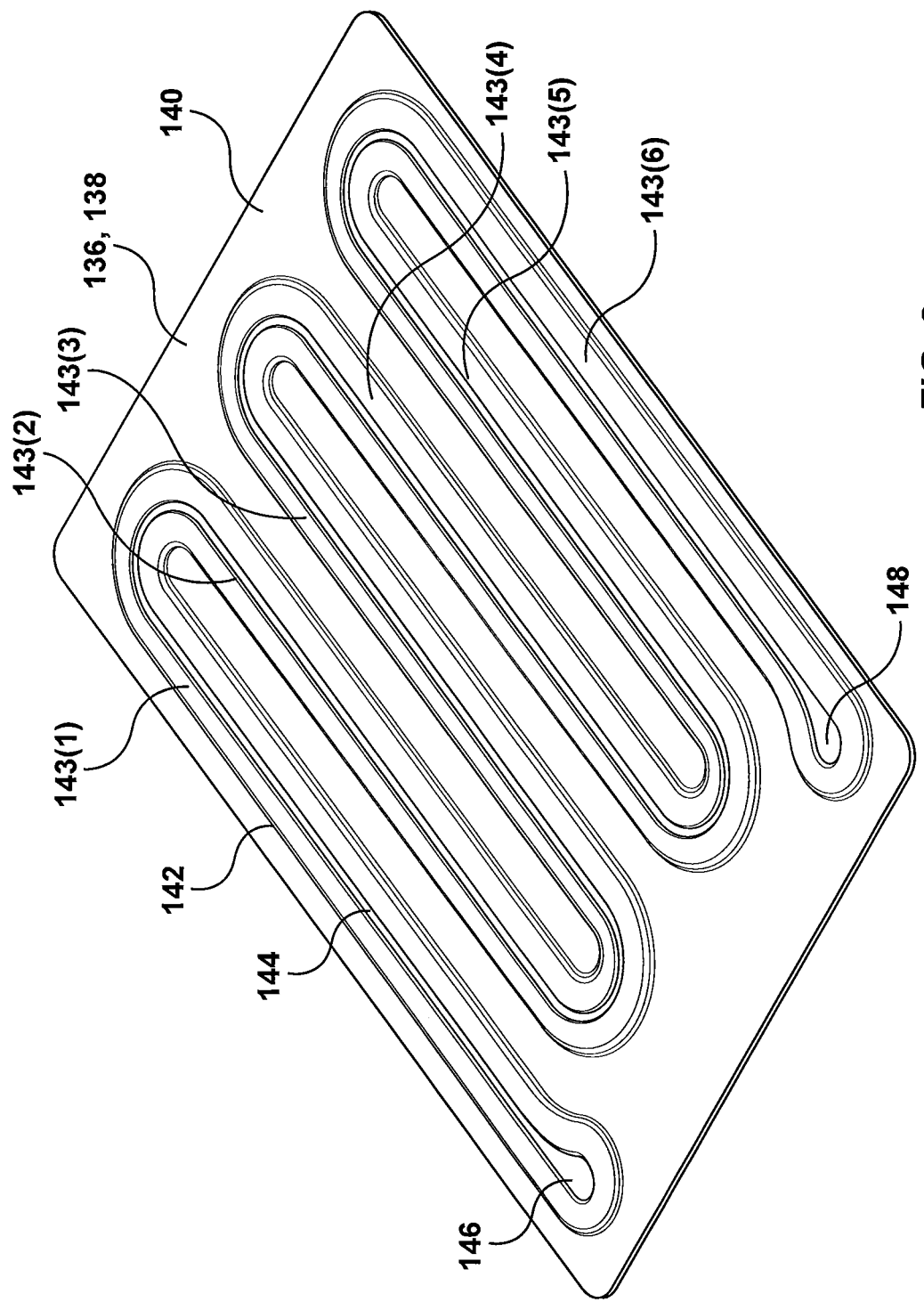
FIG. 8 is a perspective view of an inner core plate of the heat exchanger of FIG. 3.

In an example embodiment, first and second inner core plates 136 and 138 are substantially identical, and in this regard FIG. 8 shows a perspective view of an example of an inner core plate 136, 138. The inner core plate 136, 138 includes a rectangular planar plate portion 140 having a raised serpentine boss 142 formed thereon. The serpentine boss 142 conforms to the shape of internal flow passage 118 and includes parallel inner core plate regions 143(1)-143(6) (referred to generically by reference 143(i)) that correspond to respective flow chamber regions 124(1)-124(6). A serpentine slot 144 is provided along the length of the serpentine boss 142. The slot 144 terminates in enlarged inlet and outlet openings 146, 148, respectively, at its opposite ends.

Figure 9:
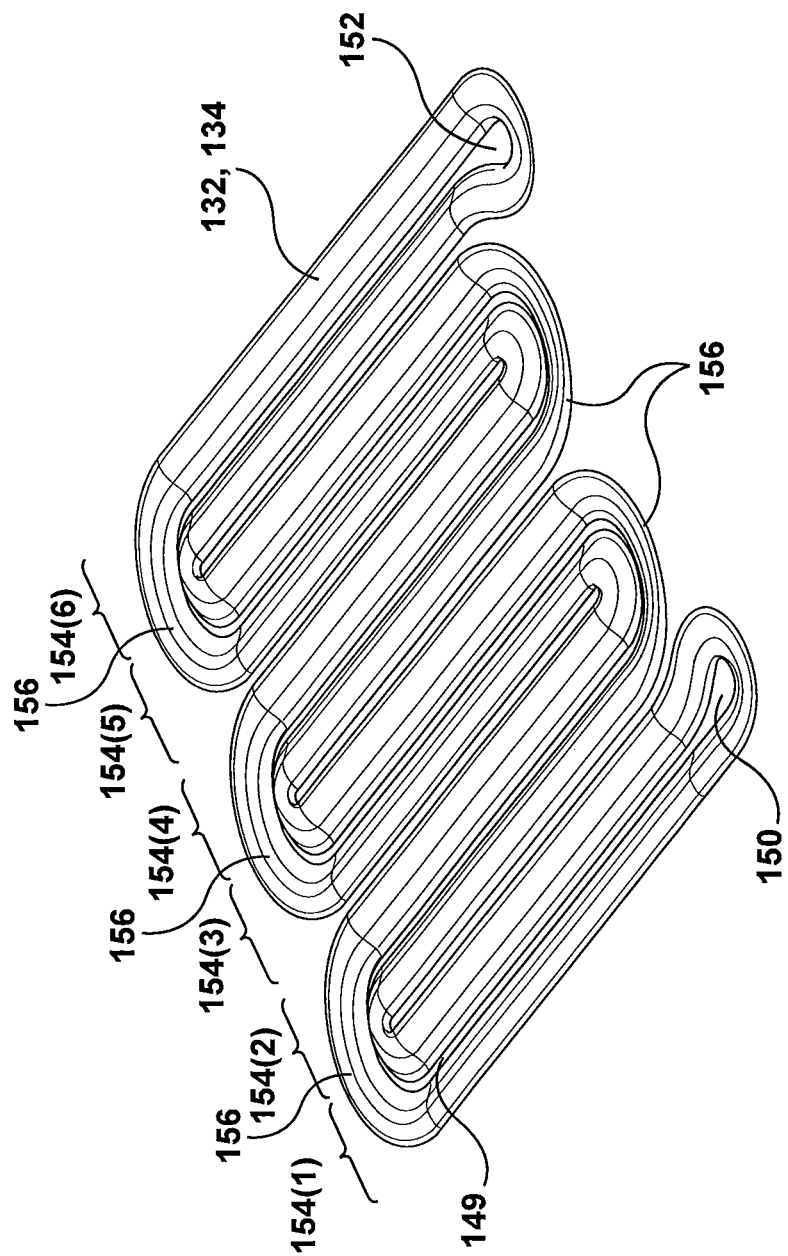
FIG. 9 is a perspective view of an outer core plate of the heat exchanger of FIG. 3.

In an example embodiment, first and second outer core plates 132 and 134 are also substantially identical, and in this regard FIG. 9 shows a perspective view of an example of an outer core plate 132, 134. The outer core plate 132, 134 is a serpentine member that conforms to the shape of internal flow passage 118. The core plate 123, 134 includes serially connected parallel core plate regions 154(1)-154(6) (referred to generically by reference 154(i)) that correspond to respective flow chamber regions 124(1)-124(6). Adjacent core plate regions 154(i) are joined by substantially U-shaped portions 156 at alternating ends of the plate 132, 134. The configuration of core plate 132, 134 allows a degree of physical isolation between each of the core plate regions 154(i) such that each of the core plate regions 154(i) can be resiliently compressed independently of the other core plate regions 154(i). A serpentine slot 149 is provided along the core plate 132, 134 and terminates in enlarged inlet and outlet openings 150, 152, respectively, at its opposite ends.

Figure 10:
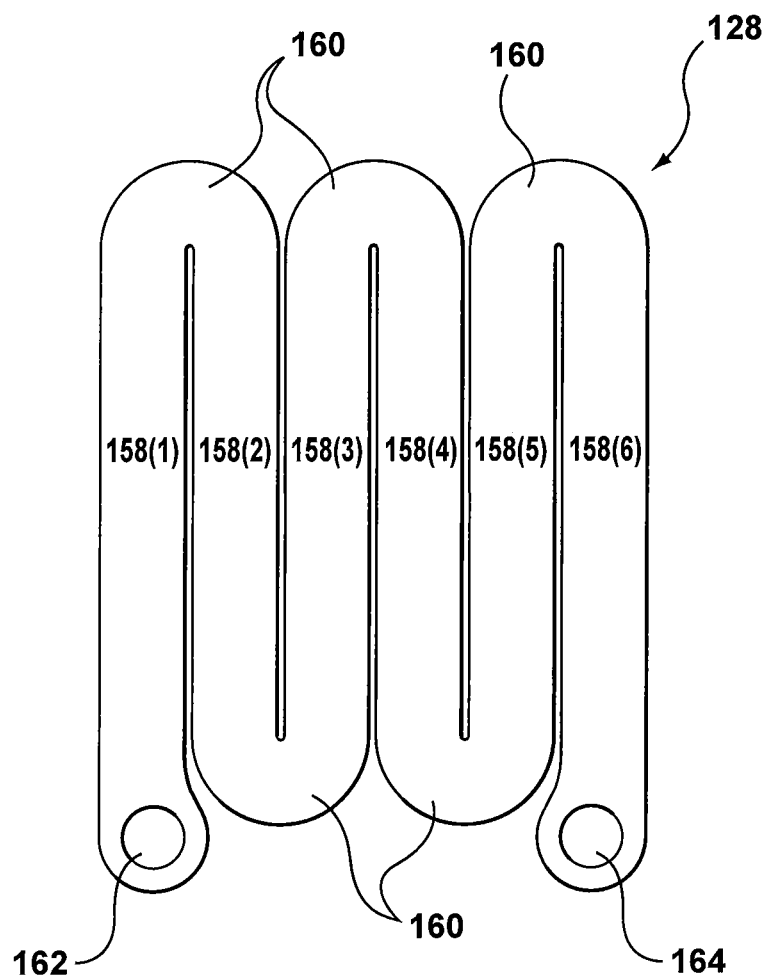
FIG. 10 is a plan view of a first closure plate of the heat exchanger of FIG. 3.

FIG. 10 is a plan view of an example of a substantially planar first cover plate 128. The first cover plate 128 is also a serpentine member that conforms to the shape of internal flow passage 118. The cover plate 128 includes serially connected parallel first cover plate regions 158(1)-158(6) (referred to generically using reference 158(i)) that correspond to respective flow chamber regions 124(1)-124(6). Adjacent first cover plate regions 158(i) are joined by substantially U-shaped portions 160 at alternating ends of the plate 128. The configuration of first cover plate 128 allows a degree of physical isolation between each of the first cover plate regions 158(i) such that each of the cover plate regions 158(i) can be displaced towards the center of the head exchanger body independently of the other cover plate regions 158(i). Enlarged inlet and outlet openings 162, 164 are provided a respective opposite ends of the serpentine cover plate 128.

Figure 11:
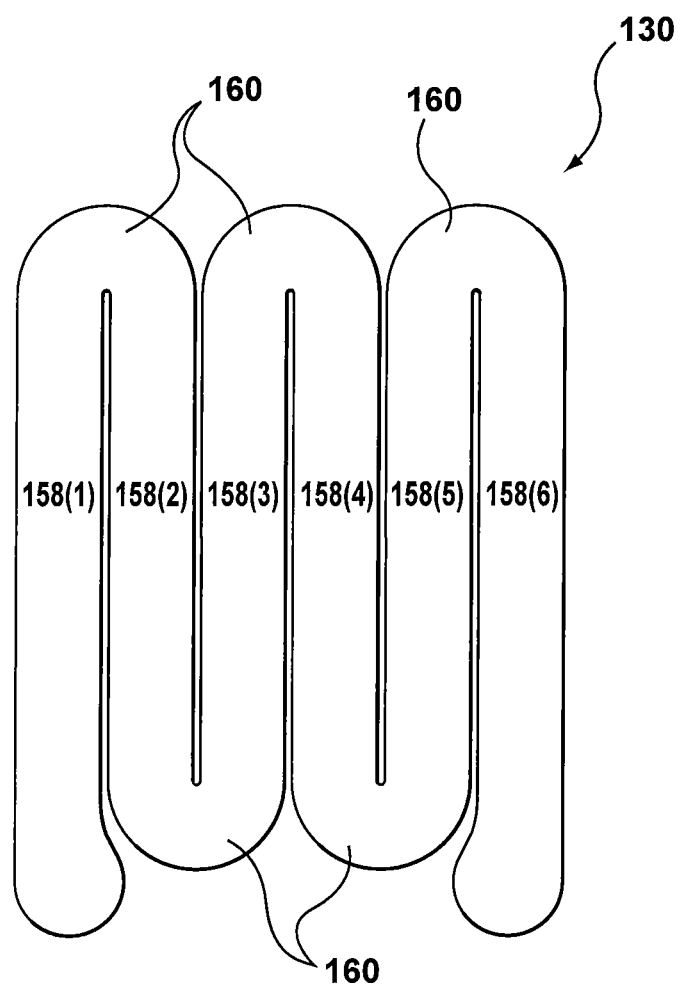
FIG. 11 is a plan view of a second closure plate of the heat exchanger of FIG. 3.
Figure 12:
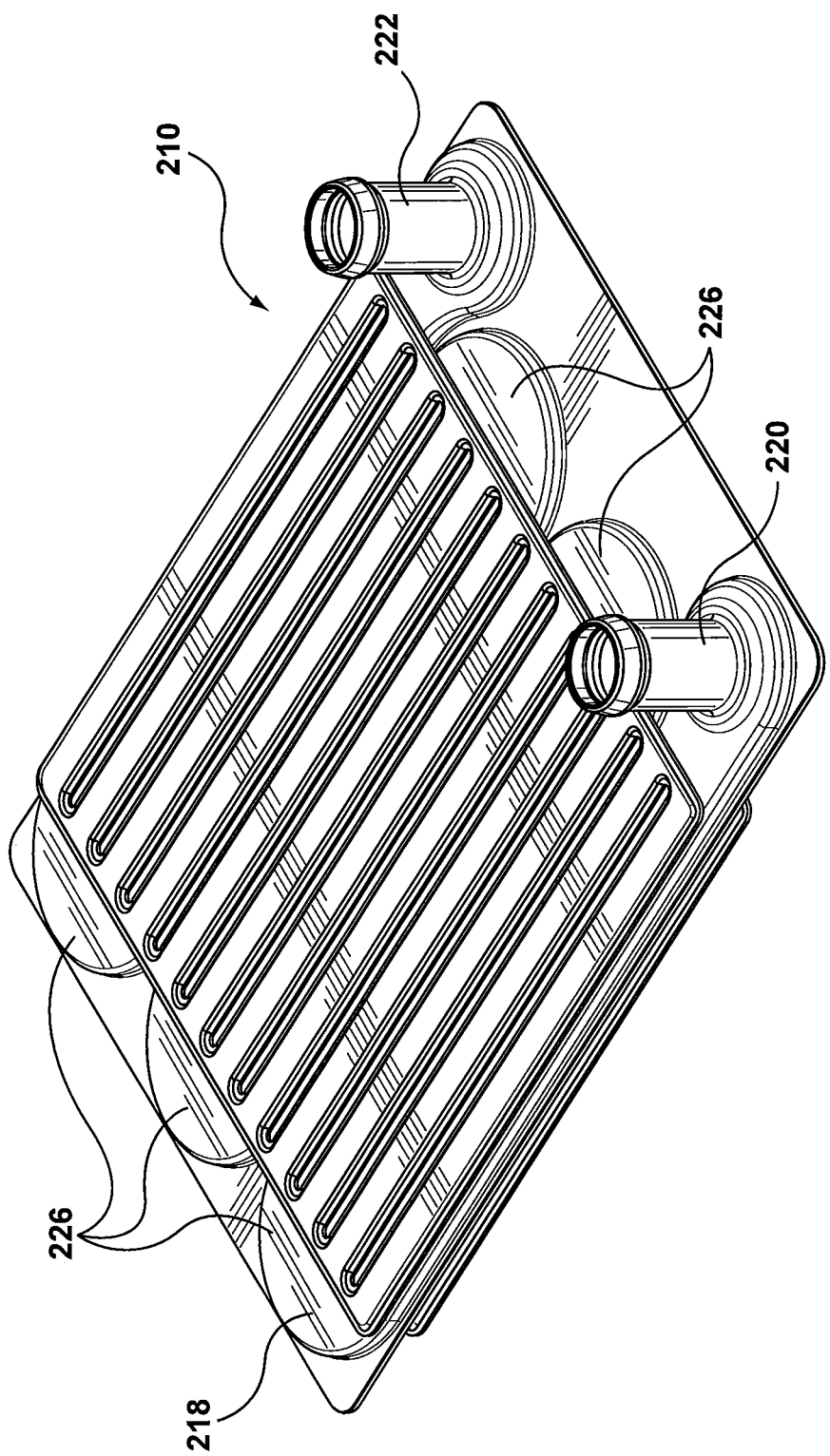
FIG. 12 is a perspective view of a fluid-cooled heat exchanger according to another example embodiment.

FIG. 11 is a plan view of an example of a substantially planar second cover plate 130. The second cover plate 130 is a serpentine member that is substantially identical to first cover plate 128 however the second cover plate does not include inlet and outlet openings 162, 164. The same reference numbers are used in the Figures for similar elements in cover plates 128 and 130.

Features of the plates 128, 130, 132, 134, 136 and 138 and their assembly will now be explained in greater detail with reference to the sectional views of FIGS. 6 and 7. In the heat exchanger 110, inner core plates 136 and 138 are joined face to face with their respective planar plate portions 140 in contact with each other and their respective raised boss portions 142 extending away from a centerline C of the heat exchanger body. For explanatory purposes, the term "inner" as used herein indicates a direction towards the centerline C, and the term "outer" indicates a direction away from the centerline C unless the context suggests otherwise. The raised boss portion 142 of the first inner core plate 136 and the second inner core plate 138 are aligned together to partially define the internal serpentine flow passage 118. As seen in FIG. 7, the raised boss portion 142 of each of first and second inner core plates 136, 138 is formed by opposing sidewalls 166 that extend from the planar plate portion 140 and which each terminate at a planar flange 168 that defines the serpentine slot 144. The planar flanges 168 are substantially parallel to the planar plate portion 140. In an example embodiment, each sidewall 166 has first arcuate wall portion 170 that curves outward relative to the centerline C and a second arcuate wall portion 172 that curves inward relative to the centerline C, thereby providing the sidewall 166 with a profile that generally approximates an "S" shape. In some example configurations, such a sidewall profile provides the raised boss 142 with a degree of resilient conformability such that the boss 142 can be deformed under pressure towards centerline C and then spring back to a normal shape when the pressure is removed. The generally S-shaped sidewall profile can in some example embodiments distribute stress so as to reduce fatigue, however other sidewall configurations can alternatively be used to reduce fatigue.

First outer core plate 132 and second outer core plate 134 are secured on opposite sides of centerline C to the first inner core plate 136 and second inner core plate 138, respectively. Each serpentine outer core plate 132, 134 defines a serpentine channel 174 that opens outward relative to the centerline C and forms part of internal serpentine flow passage 118. In particular the channel 174 is defined by a pair of opposed sidewalls 176. The sidewalls 176 each extend from an outer planer peripheral flange 178 to an inner planar flange 180, with the outer flange 178 and the inner flange 180 having substantially parallel opposite facing surfaces. In the illustrated embodiment, each sidewall 176 has first arcuate wall portion 182 that curves outward relative to the centerline C and a second arcuate wall portion 184 that curves inward relative to the centerline C, thereby providing the sidewall 176 with a profile that generally approximates an "S" shape. In one example the inner flanges 186 each terminate at an inwardly extending lip 186, with the lip 186 on one flange 180 opposing the lip 186 on the other flange 180 to define the serpentine slot 149.

The inner flanges 180 of first outer core plate 132 mate with respective planar portions 168 of the first inner core plate 136 to secure the first outer core plate 132 to the first inner core plate 136. As illustrated in FIGS. 6 and 7, the outer core plate serpentine slot 149 is aligned with the inner core plate serpentine slot 144, with the opposed lips 186 of the outer core plate extending into the inner core plate serpentine slot 144. The positioning of the outer core plate lips 186 within the inner core plate slot 144 provides a mechanical interlock between the inner and outer core plate strengthening the joint therebetween and also assists in providing a seal against inter plate leakage, and can assist in aligning the plates during assembly of the heat exchanger. In some configurations, the positioning of the outer core plate lips 186 within the inner core plate slot 144 can act as a limit on the extent to which the flow chamber region 124(i) can be deformed. In some example embodiments other deformation limiting features may be provided in various regions of the body of the heat exchanger to limit deformation of such regions. The second outer core plate 134 is secured to the second inner core plate 138 in a similar manner that the first outer core plate 132 is secured to the first inner core plate 136. In some example embodiments the interlock between the inner and outer core plates can be reversed with the lips 186 being provided on the inner core plate rather than the outer core plate and then inserted into the slot 149 on the outer core plate.

In some example embodiments, the generally S-shaped profile of the outer core plate 132, 134 sidewalls 176 provides the outer core plates 132, 134 with a degree of resilient conformability such that the outer core plates can be deformed under pressure towards centerline C and then spring back to a normal shape when the pressure is removed. The generally S-shaped sidewall profile can in some example embodiments distribute stress so as to reduce fatigue; however other sidewall configurations can al alternatively be used to reduce fatigue.

In the illustrated embodiment, the serpentine first outer cover plate 128 is secured to an outer side of the serpentine first outer core plate 132 to seal the first outer core plate channel 174. Each of the cover plate regions 158(i) and U-shaped portions includes a planar central region 188 having inwardly directed flanges 190 along the opposite peripheral edges thereof. Peripheral sections of the planar central region 188 mate with the planar outer flanges 178 of the first outer core plate 132, with the outer core plate planar outer flanges 178 being nested within the inwardly directed flanges 190 of the first outer cover plate 128. The serpentine second outer cover plate 130 is secured in a similar manner to an outer side of the serpentine second outer core plate 134 to seal the second outer core plate channel 174. The inwardly directed flanges 190 may in some embodiments assist in positioning of the cover plates during assembly, and can also have a deflection or deformation limiting effect on the flow chamber regions. In the illustrated embodiment of heat exchanger 110, the inlet openings 146 of the inner core plates 136, 138, the inlet openings 150 of the outer core plates 132, 134 and the inlet opening of the outer cover plate 128 are aligned to form a fluid inlet to the heat exchanger internal flow passage 118, with inlet fixture 120 secured to the outer cover plate 128. Similarly, the outlet openings 148 of the inner core plates 136, 138, the outlet openings 152 of the outer core plates 132, 134 and the outlet opening of the outer cover plate 128 are aligned to form a fluid outlet to the heat exchanger internal flow passage 118, with outlet fixture 122 secured to the outer cover plate 128. The second cover plate 130 seals the heat exchanger fluid inlet and fluid outlet on the side of the heat exchanger opposite the side to which the inlet and outlet fixtures 120, 122 are located. Referring again to FIG. 6, in the presently described example embodiment, each fluid chamber 116(i) of each fluid region 124(i) includes three communicating flow areas, namely the channel 174 that is defined by first cover plate 128 and first outer core plate 132, the channel 174 that is defined by second cover plate 130 and second outer core plate 134, and the central channel 192 that is defined between inner core plates 136, 138. As a result of slots 144, 149, the channels 174, 192 are in fluid communication along the entire length serpentine flow passage 118.

The planar central regions 188 of the inner and outer cover plates 128, 130 provide a physical interface with the battery cell containers 104 of the battery unit 100. Thus, in an example embodiment, each fluid chamber region 124(i) of the heat exchanger 110 has a first cover plate elongate region 158(i) that engages a respective battery cell container 104 in the first battery module 102(1) and a second cover plate elongate region 158(i) that engages, on the opposite side of the heat exchanger, a respective battery cell container 104 in the second first battery module 102(1). In this regard, each fluid chamber region 124(i) of the heat exchanger 110 is secured between and provides heat exchange surfaces with a pair of opposed battery cell containers 104. As will be appreciated from the above description, the sidewalls 176 of the outer core plates 132, 134 and the sidewalls 166 of the inner core plates 136, 138 are configured to provide resilient compressibility of each of the parallel fluid chamber regions 124(i). Furthermore, physical separation by elongate slots 194 (see FIG. 5 for example) between the parallel regions 154(i) of the outer core plates 132, 134 allows the fluid chamber regions 124(i) to each be individually compliant to the physical separation between the two battery cell containers 104 that the fluid chamber region 124(i) is located between. The pressure of the heat exchanger fluid within the flow chambers 116(i) can effect the compressibility of the fluid flow regions 124(i) in some example embodiments.

By way of non-limiting examples, in some applications, the plates used to form the heat exchanger 110 may be formed from H3534 aluminum braze sheet and/or 3003 aluminum. Alternative plate configurations can be used to achieve similar results—for example, fewer than six plates can be used to form a heat exchanger having individually compliant flow regions.

FIGS. 12-15 show a further example of a heat exchanger 210 that can be used as an alternative to heat exchanger 110 in some applications. The heat exchanger 210 is similar in function and construction to heat exchanger 110 except for differences that will be apparent from the Figures and the following description. In an example embodiment, the heat exchanger 210 includes a substantially rigid core plate structure 228 that is sandwiched between substantially planar first and second compliant plate structures 230. In example embodiments, the compliant plate structures 230 are each configured to be resiliently deformable such that the heat exchanger 210 is dimensionally compliant to the space between the first battery module 102(1) and the second battery module 102(2). The core plate structure 228 of heat exchanger 210 defines an internal serpentine heat exchanger fluid flow passage 218 having a first end in fluid communication with an inlet fixture 220 and a second end in fluid communication with an outlet fixture 222. In the illustrated example, the serpentine fluid flow passage 218 includes multiple serially connected parallel fluid chambers 216(1)-216(6) (generically referred to using reference number 216(*i*) herein—see FIG. 15), with each fluid chamber being joined to a successive fluid chamber by a respective substantially U-shaped flow passage 226. In operation, a heat exchange fluid such as a cooling fluid enters fluid inlet fixture 220, flows through fluid chamber 216(1), through a first U-turn passage 226 into fluid chamber 216(2) and then through a second U-turn passage 226 into fluid chamber 216(3) and so on until the fluid flows through the final fluid chamber 216(6) and exits from outlet fixture 222.

As with heat exchanger 110, in one example embodiment each fluid chamber 216(*i*) of heat exchanger 210 is positioned between a cell container 104 located in one module 102(1) and an opposing cell container 104 located in the adjacent module 102(2).

The fluid chambers 216(1)-216(6) are each formed within a respective fluid chamber region 224(1)-224(6) (generically referred to using reference number 224(*i*) herein) of the core plate structure 228 of the heat exchanger 210.

Referring to the sectional views of the heat exchanger 210 shown in FIG. 15, the heat exchanger core plate structure 228 is formed from opposed first and second core plates 232, 234; and the first and second compliant plate structures 230 are each formed from opposed compliant plates 236. In an example embodiment, the plates are each formed from roll formed or stamped aluminum or aluminum alloy and are brazed together to form the body of the heat exchanger 210. However, the heat exchanger could alternatively be formed from other resilient metals or materials, including plastics, and other processes.

In an example embodiment, first and second core plates 232 and 234 are substantially identical, and in this regard FIGS. 16 and 17 show plan views of examples of core plate 234 and 232, respectively. The core plates 234 and 232 each include a rectangular planar plate portion 240 having a raised serpentine boss 242 formed thereon. The serpentine boss 242 conforms to the shape of internal flow passage 218 and includes parallel core plate regions 243(1)-243(6) (referred to generically by reference 243(*i*)) that correspond to respective flow chamber regions 224(1)-224(6). A difference between first core plate 232 and second core plate 234 is that inlet and outlet openings 246, 248, are formed respectively, at the opposite ends of the raised boss 242 of first core plate 232.

Figure 19:
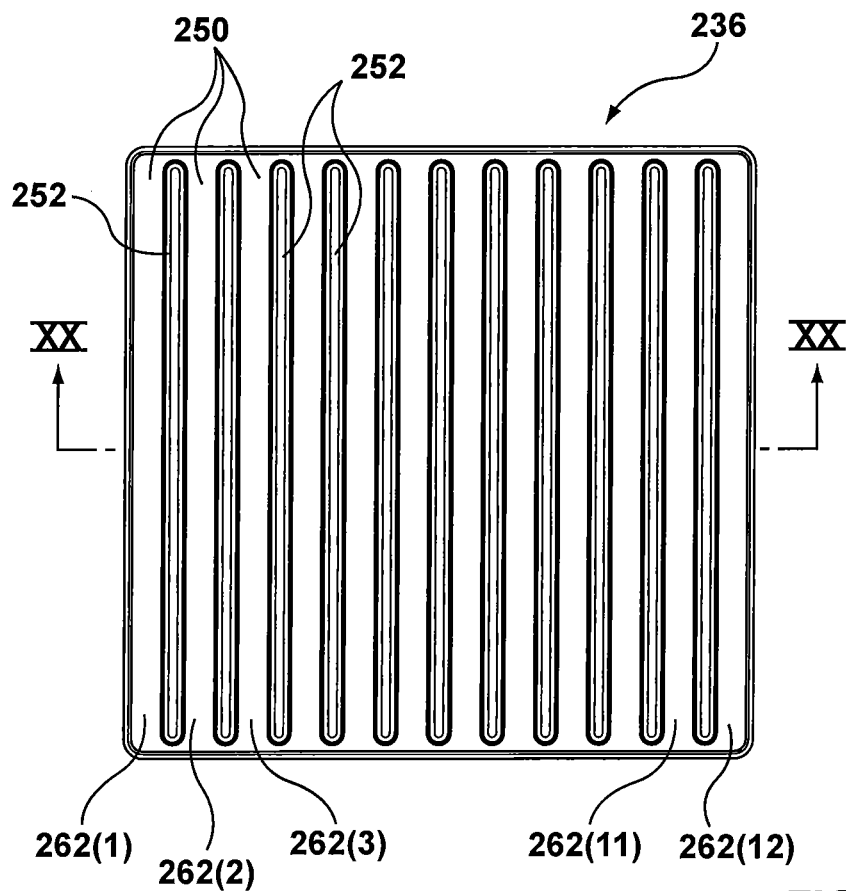
FIG. 19 is a plan view of a compliant plate of the heat exchanger of FIG. 12.
Figure 20:
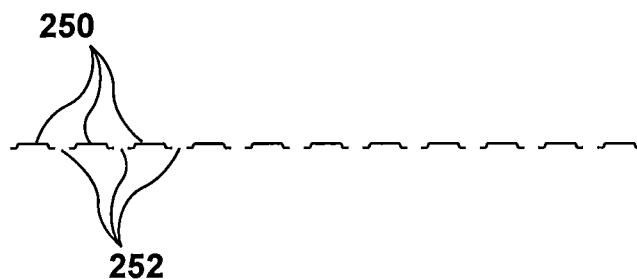
FIG. 20 is a sectional view of the compliant plate taken across the lines XX-XX of FIG. 19.
Figure 21:
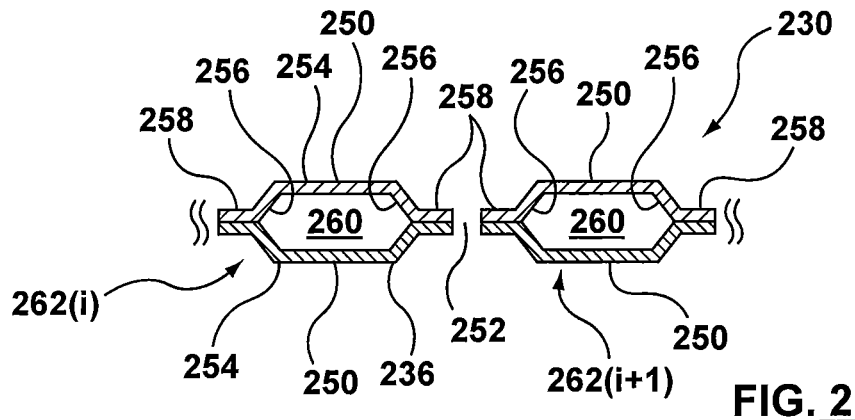
FIG. 21 is an enlarged sectional view of part of a compliant plate structure of the heat exchanger of FIG. 12.

In an example embodiment, first and second compliant plates 236 that form the compliant plate structures 230 are substantially identical, and in this regard FIGS. 19 and 20 show an example of a compliant plate 236. In the illustrated example, compliant plate 236 is a rectangular plate that includes a plurality of raised parallel, elongate bosses 250 that are separated by slots 252 that extend through the plate. FIG. 21 is an enlarged partial sectional view showing two compliant plates 236 opposingly mated to form a compliant plate structure 230. As seen in FIG. 21, each of the elongate bosses 250 includes a planar central wall that is bordered by sidewalls 256 which each terminate at a peripheral planer flange 258. The flanges 258 from one compliant plate 236 mate with the flanges 258 from the opposing compliant plate 236 to form compliant plate structure 230. As seen in FIG. 21, the opposed bosses 250 from the mated compliant plates 236 define internal chambers 260 such that the mated compliant plates 236 define a plurality of parallel, elongate compliant chamber regions 262(1)-262(12) (generically referred to as 262(*i*) herein). In one example embodiment, chambers 260 are sealed chambers that are filled with a fluid or gas such as air or filled with a non-fluid thermal gasket. In another example embodiment, chambers 260 may be vented. In the illustrated embodiment, the compliant plate structure 230 includes twelve elongate compliant regions 262(*i*), two for each of the six flow chamber regions 224(*i*) of the core plate structure 228.

In an example embodiment, the compliant regions 262(*i*) of the compliant plate structure 230 are each individually deformable such that each of the compliant regions 262(*i*) can be individually compressed up to a threshold amount under external pressure and then rebound back to its original shape when the pressure is removed.

In some example embodiments, the compliant plates 236 are formed from thinner material than the core plates 232, 234 with the result that the core plate structure 228 is relatively rigid compared to the compliant plate structures 230 that it is sandwiched between. By way of non limiting example, compliant plates 236 could be from aluminum having a thickness of 0.2 mm and the core plates 232, 234 formed from aluminum having a thickness of 0.6 mm, however many alternative thicknesses could be used.

Turning again to FIGS. 15-18, in the heat exchanger 210, first and second core plates 232, 234 are joined face to face with their respective planar plate portions 240 in contact with each other and their respective raised boss portions 242 extending away from each other to define the internal multi-pass serpentine heat exchanger fluid flow passage 218. Compliant plate structures 230 are provided on the opposite faces of the core plate structure 228 to provide an interface with the first battery module 102(1) and the second battery module 102(2), respectively. In the illustrated embodiment, one each side of the core plate structure 228, a pair of parallel elongate compliant chambers 262(*i*), 262(*i*+1) extend the length of each fluid chamber region 224(*i*). The compliant chambers 262(*i*) and 262(*i*+1) that are located on opposite sides of each fluid chamber region 224(*i*) permits each of the fluid chamber regions to be individually compliant to physical separation between the two battery cell containers 104 that the fluid chamber region 124(*i*) is located between.

Accordingly, in the embodiments of FIGS. 1 to 21, a heat exchanger 110, 210 is placed between two battery modules 102(1) and 102(2) that each include a plurality of battery cell containers. In some applications, the surfaces of the battery modules 12(1) and 102(2) that contact the opposite sides of the heat exchanger 110, 120 may not be perfectly flat due to a lack of perfect alignment of the battery cell containers that make up the battery modules 102(1) and 102(2). Thus, in at least some example embodiments, to help maintain contact between the battery module surfaces and the opposite sides of the heat exchanger 110, 210, the heat exchanger 110, 120 includes independently conformable regions that each have a spring effect such that each conformable region coincides with a respective pair of opposed battery cell containers and can adaptively flex under the compressive forces applied at the region. Accordingly, in at least some embodiments, when assembling a battery unit that includes battery modules 102(1), 102(2) and heat exchanger 110, 120, a compressive action or step occurs during which regions of the heat exchanger 110 undergo a degree of compression to facilitate good thermal contact between the battery modules 102(1), 102(2) and the heat exchanger 110, 120.

In some example embodiments the conformal heat exchanger configurations described above could be used between fuel cell modules in place of battery cell modules. Accordingly, the heat exchanger structures described herein can be used in a power producing unit that comprises a first module comprising a plurality of power producing cells such as battery cells or fuel cells and a second module comprising a plurality of power producing cells such as battery cells or fuel cells, the heat exchanger structure being disposed between opposing surfaces of the first stack and the second stack and defining one or a plurality of fluid flow passages, the heat exchanger structure being dimensionally compliant to accommodate different separation distances between opposing cells within the battery unit, and in some example embodiments, dimensionally compliant to compress under expansion of the first and second stacks and expand under subsequent contraction of the first and second stacks. In some example embodiments, an intermediate material or structure may be placed between the outer cover plates and the battery cell containers 104 to enhance thermal conduction and account for irregularity in the surface profiles of the individual battery cell containers. The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

What is claimed is:

1. A heat exchanger for a battery unit, the heat exchanger comprising:
   first and second inner core plates, each inner core plate comprising:
      a generally planar plate portion; and
      a serpentine boss formed in and extending out of the generally planar plate portion, the serpentine boss being made up of a plurality of generally parallel inner core plate regions interconnected by U-shaped regions and extending between an inlet end and an outlet end;
   wherein said first and second inner core plates are arranged in mating relationship, with one plate being inverted with respect to the other such that the serpentine boss of one plate is spaced apart from the serpentine boss of the other plate so as to form an internal fluid flow passage therebetween that extends from said inlet end to said outlet out;
   a fluid inlet in fluid communication with said inlet end of said internal fluid flow passage for inletting a heat exchange fluid into said heat exchanger;
   a fluid outlet in fluid communication with said outlet end of said internal fluid flow passage for discharging said heat exchange fluid from said heat exchanger; and
   first and second compliant plate structures, wherein said first compliant plate structure is arranged on and secured to the first inner core plate and said second compliant plate structure is arranged on and secured to the second inner core plate;
   wherein said first and second compliant plate structures are resiliently deformable so as to compress under pressure and to return to normal shape upon removal of said pressure.

2. The heat exchanger as claimed in claim 1, wherein said first compliant plate structure comprises:
   a first outer core plate arranged on and secured to said first inner core plate; and
   a first cover plate arranged on and secured to said first outer core plate;
   said second compliant plate structure comprises:
      a second outer core plate arranged on and secured to said second inner core plate; and
      a second cover plate arranged on and secured to second outer core plate;
   wherein said first and second compliant plate structures each define at least one enclosed channel between the first outer core plate and first cover plate and between the second outer core plate and second cover plate; and
   wherein at least said first and second outer core plates are resiliently deformable with respect to said first and second cover plates, and the first and second outer core plates forming compliant chambers which are individually deformable to a spacing between a first battery module and second battery module.

3. The heat exchanger as claimed in claim 2, wherein:
   said first and second inner core plates each further comprise a slot formed in said serpentine boss and extending between said inlet end and said outlet end, and the slots connecting a first channel formed by the first cover plate and first outer core plate, a second channel formed by the second cover plate and second outer core plate, and a third channel formed by the first and second inner core plates,
   said first and second outer core plates are each in the form of a serpentine member defining an open serpentine channel having side walls that extend away from the serpentine bosses formed in the first and second inner core plates, the serpentine channel therefore being oppositely disposed with respect to said serpentine bosses, and a serpentine slot formed at a base portion of said serpentine channel, the serpentine slot of said serpentine channel being aligned with said slot formed in said first and second inner core plates;
   said first and second cover plates each comprise a plurality of generally parallel cover plate regions interconnected by U-shaped portions so as to conform to the shape of the internal fluid flow passage, wherein said first and second cover plates sealingly enclose the open serpentine channel formed by said first and second outer core plates; and wherein the side walls of the serpentine channel formed by said first and second outer core plates are resiliently conformable so as to compress under pressure and return to normal shape upon removal of said pressure.

4. The heat exchanger as claimed in claim 2, wherein said first and second outer core plates and said first and second cover plates are substantially identical, each plate comprising:
a generally planar portion surrounded by a peripheral sealing flange;
a plurality of generally parallel bosses formed in and extending out of the generally planar portion of the inner core plates, said generally parallel bosses being spaced apart and separated from each other by planar strips;
wherein said first and second cover plates are oppositely disposed with respect to said first and second outer core plates such that the peripheral sealing flange of said respective first and second cover plates seals against the peripheral sealing flange of the corresponding first and second outer core plates thereby spacing apart the respective generally parallel bosses forming enclosed channels therebetween.

5. A battery unit, comprising:
a first battery module comprising a plurality of battery cell containers each housing at least one battery cell;
a second battery module comprising a plurality of battery cell containers each housing at least one battery cell;
a heat exchanger disposed in a space between the first battery module and the second battery module such that a first side of the heat exchanger is in contact with, or substantially in contact with, the plurality of battery cell containers of the first battery module and a second side of the heat exchanger is in contact with, or substantially in contact with, the plurality of battery cell containers of the second battery module, wherein the heat exchanger includes:
first and second inner core plates, each inner core plate comprising:
a generally planar plate portion; and
a serpentine boss formed in and extending out of the generally planar plate portion, the serpentine boss being made up of a plurality of generally parallel inner core plate regions interconnected by U-shaped regions and extending between an inlet end and an outlet end;
wherein said first and second inner core plates are arranged in mating relationship, with one plate being inverted with respect to the other such that the serpentine boss of one plate extends out of the generally planar portion in a first direction while the serpentine boss of the other one of the first and second plates extends out of the generally planar portion in a second direction opposite to the first direction such that while the first and second inner core plates are disposed in their mating relationship the oppositely disposed serpentine bosses define an internal fluid flow passage therebetween that extends from said inlet end to said outlet end;
a fluid inlet in fluid communication with said inlet end of said internal fluid flow passage for inletting a heat exchange fluid into said heat exchanger;
a fluid outlet in fluid communication with said outlet end of said internal fluid flow passage for discharging said heat exchange fluid from said heat exchanger; and
a first compliant plate structure disposed on and secured to the first inner core plate and defining the first side of the heat exchanger;
a second compliant plate structure disposed on and secured to the second inner core plate and defining the second side of the heat exchanger;
wherein said first and second compliant plate structures are resiliently deformable so as to compress to a first position in response to a first spacing between the first and the second battery modules and to expand to a second position in response to a second spacing between the first and the second battery modules.

6. The battery unit of claim 5, wherein the first and second compliant plate structures each comprise:
a plurality of independently compressible regions, the plurality of independently compressible regions of the first and second compliant plate structures compress and expand such that the heat exchanger maintains contact with the first and second battery modules in the first and second spacings between the first and the second battery modules.

7. The battery unit of claim 5, wherein the first compliant plate structure comprises:
a first outer core plate disposed on and secured to said first inner core plate; and
a first cover plate arranged on an secured to said first outer core plate;
the second compliant plate structure comprises:
a second outer core plate arranged on and secured to said second inner core plate; and
a second cover plate arranged on and secured to said second outer core plate;
wherein said first and second compliant plate structures each define at least one enclosed channel between the first outer core plate and first cover plate and between the second outer core plate and second cover plate; and
wherein at least said first and second outer core plates are resiliently deformable with respect to said first and second cover plates
wherein the compliant plate structures are formed from thinner material than the core plates.

8. The battery unit of claim 6, wherein the battery cell containers of the first battery module are located in spaced apart opposition to respective battery cell containers of the second battery module, and each of the independently compressible regions are positioned between and engage a respective battery cell container of the first battery module and a respective battery cell container of the second battery module with each of the individually compressible regions conforming to the spacing of the battery cell containers between which it is positioned.

9. The battery unit of claim 8, wherein each of the independently compressible regions defines a flow channel therethrough for the heat exchanger fluid.

10. The battery unit of claim 5, wherein the first compliant plate structure comprises:
a first outer core plate arranged on and secured to said first inner core plate; and
a first cover plate arranged on an secured to said first outer core plate;
the second compliant plate structure comprises:
a second outer core plate arranged on and secured to said second inner core plate; and a second cover plate arranged on and secured to said second outer core plate;

wherein said first and second compliant plate structures each define at least one enclosed channel between the first outer core plate and first cover plate and between the second outer core plate and second cover plate; and wherein at least said first and second outer core plates are resiliently deformable with respect to said first and second cover plates.

11. The battery unit of claim 7, wherein said first and second outer core plates and said first and second cover plates are substantially identical, each plate comprising:
  a generally planar portion surrounded by a peripheral sealing flange;
  a plurality of generally parallel bosses formed in and extending out of the generally planar portion of the plates, said generally parallel bosses being spaced apart and separated from each other by planar strips;
  wherein said first and second cover plates are oppositely disposed with respect to said first and second outer core plates such that the peripheral sealing flange of said respective first and second cover plates seals against the peripheral sealing flange of the corresponding first and second outer core plate thereby spacing apart the respective generally parallel bosses forming enclosed channels therebetween.

12. The battery unit of claim 5, wherein the first compliant plate structure includes a pair of substantially planar mating plates, each mating plate having a plurality of independently compressible plate regions; and
  the second compliant plate structure includes a pair of substantially planar mating plates, each mating plate having a plurality of independently compressible plate regions.

13. The battery unit of claim 12, wherein the pair of substantially planar mating plates of the first compliant plate structure and the pair of substantially planar mating plates of the second compliant plate structure have a thickness that is less than the thickness of the first and second core plates.

14. The heat exchanger of claim 1, wherein the first and second compliant plate structures compress to a first position in response to a first spacing between a first battery module and a second battery module and the first and second compliant plate structures expand to a second position in response to a second spacing between the first and second battery modules.

15. The heat exchanger of claim 1, wherein sidewalls of first and second core plate are compressible to allow for individual deformation of the compliant chambers to the spacing between the first and second battery modules.

16. The heat exchanger of claim 15, wherein each compliant chamber is aligned with slots of the first and second core plates to allow for individual deformation of the compliant chambers.

17. The heat exchanger of claim 14, wherein the first and second compliant plate structures maintain contact with the first and second battery modules when in the first and second positions.

18. The heat exchanger of claim 1, wherein the first and second compliant plate structures are each formed by two opposing compliant plates.

19. The heat exchanger of claim 18, wherein each of the first and second compliant plates are arranged between a respective pair of a core plate and battery module.

* * * * *